(12) United States Patent
Ferris

(10) Patent No.: US 9,037,692 B2
(45) Date of Patent: May 19, 2015

(54) MULTIPLE CLOUD MARKETPLACE AGGREGATION

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 301 days.

(21) Appl. No.: 12/324,758

(22) Filed: Nov. 26, 2008

(65) Prior Publication Data

US 2010/0131624 A1    May 27, 2010

(51) Int. Cl.
 G06F 15/177    (2006.01)
 G06Q 30/06    (2012.01)
 G06F 9/50    (2006.01)
 G06F 9/445    (2006.01)

(52) U.S. Cl.
 CPC .............. *G06Q 30/06* (2013.01); *G06F 9/5072* (2013.01); *G06F 8/65* (2013.01); *G06F 9/5027* (2013.01); *G06F 2209/5015* (2013.01)

(58) Field of Classification Search
 USPC .......... 709/220, 221, 222, 223, 226; 718/104, 718/105; 705/26
 See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |

(Continued)

OTHER PUBLICATIONS

Ferris et al., "Methods and Systems for Generating Cross-Mapping of Vendor Software in a Cloud Computing Environment", U.S. Appl. No. 12/790,527, filed May 28, 2010.

(Continued)

*Primary Examiner* — Jude Jean Gilles
*Assistant Examiner* — Cheikh Ndiaye
(74) *Attorney, Agent, or Firm* — Lowenstein Sandler LLP

(57) ABSTRACT

Embodiments relate to systems and methods for multiple cloud marketplace aggregation. An aggregation engine communicates with a set of multiple cloud marketplaces, each of which communicates with an associated set of clouds. A requesting entity, such as a user requesting the instantiation of a set of virtual machines, can transmit a resource request to the aggregation engine. The aggregation engine can fan out or distribute a replicated request to the set of multiple cloud marketplaces. Each cloud marketplace can receive the request and respond to indicate available resources that can be produced from their respect set of clouds. The aggregation engine can collect the responses of the various marketplaces, and can generate one or more selections based on selection logic such as best match, cost factors, or other criteria. In embodiments, a user can manually select the desired marketplace(s) to instantiate or update their virtual machine or other target objects.

21 Claims, 6 Drawing Sheets

(56) References Cited

U.S. PATENT DOCUMENTS

| | | | |
|---|---|---|---|
| 2005/0182727 | A1 | 8/2005 | Robert et al. |
| 2005/0289540 | A1 | 12/2005 | Nguyen et al. |
| 2006/0075042 | A1 | 4/2006 | Wang et al. |
| 2006/0085530 | A1 | 4/2006 | Garrett |
| 2006/0085824 | A1 | 4/2006 | Bruck et al. |
| 2006/0130144 | A1 | 6/2006 | Wernicke |
| 2006/0177058 | A1 | 8/2006 | Sarwono et al. |
| 2006/0224436 | A1 | 10/2006 | Matsumoto et al. |
| 2007/0011291 | A1 | 1/2007 | Mi et al. |
| 2007/0028001 | A1 | 2/2007 | Phillips et al. |
| 2007/0226715 | A1 | 9/2007 | Kimura et al. |
| 2007/0283282 | A1 | 12/2007 | Bonfiglio et al. |
| 2007/0294676 | A1 | 12/2007 | Mellor et al. |
| 2008/0080396 | A1* | 4/2008 | Meijer et al. .................. 370/254 |
| 2008/0080718 | A1 | 4/2008 | Meijer et al. |
| 2008/0082538 | A1 | 4/2008 | Meijer et al. |
| 2008/0082601 | A1 | 4/2008 | Meijer et al. |
| 2008/0083025 | A1 | 4/2008 | Meijer et al. |
| 2008/0083040 | A1 | 4/2008 | Dani et al. |
| 2008/0086727 | A1 | 4/2008 | Lam et al. |
| 2008/0091613 | A1 | 4/2008 | Gates et al. |
| 2008/0104608 | A1 | 5/2008 | Hyser et al. |
| 2008/0215796 | A1 | 9/2008 | Lam et al. |
| 2008/0240150 | A1 | 10/2008 | Dias et al. |
| 2009/0012885 | A1 | 1/2009 | Cahn |
| 2009/0025006 | A1 | 1/2009 | Waldspurger |
| 2009/0037496 | A1 | 2/2009 | Chong et al. |
| 2009/0089078 | A1 | 4/2009 | Bursey |
| 2009/0099940 | A1* | 4/2009 | Frederick et al. ............... 705/26 |
| 2009/0132695 | A1 | 5/2009 | Surtani et al. |
| 2009/0177514 | A1 | 7/2009 | Hudis et al. |
| 2009/0210527 | A1 | 8/2009 | Kawato |
| 2009/0210875 | A1 | 8/2009 | Bolles et al. |
| 2009/0216999 | A1* | 8/2009 | Gebhart et al. .................. 712/36 |
| 2009/0217267 | A1 | 8/2009 | Gebhart et al. |
| 2009/0222805 | A1 | 9/2009 | Faus et al. |
| 2009/0228950 | A1 | 9/2009 | Reed et al. |
| 2009/0248693 | A1 | 10/2009 | Sagar et al. |
| 2009/0249287 | A1 | 10/2009 | Patrick |
| 2009/0260007 | A1 | 10/2009 | Beaty et al. |
| 2009/0265707 | A1 | 10/2009 | Goodman et al. |
| 2009/0271324 | A1 | 10/2009 | Jandhyala et al. |
| 2009/0276771 | A1 | 11/2009 | Nickolov et al. |
| 2009/0287691 | A1 | 11/2009 | Sundaresan et al. |
| 2009/0299905 | A1 | 12/2009 | Mestha et al. |
| 2009/0300057 | A1 | 12/2009 | Friedman |
| 2009/0300151 | A1 | 12/2009 | Friedman et al. |
| 2009/0300169 | A1 | 12/2009 | Sagar et al. |
| 2009/0300641 | A1 | 12/2009 | Friedman et al. |
| 2010/0042720 | A1 | 2/2010 | Stienhans et al. |
| 2010/0058347 | A1 | 3/2010 | Smith et al. |
| 2010/0131590 | A1 | 5/2010 | Coleman et al. |
| 2010/0169477 | A1 | 7/2010 | Stienhans et al. |
| 2010/0220622 | A1 | 9/2010 | Wei |
| 2010/0299366 | A1 | 11/2010 | Stienhans et al. |
| 2011/0016214 | A1 | 1/2011 | Jackson |
| 2011/0131335 | A1 | 6/2011 | Spaltro et al. |

OTHER PUBLICATIONS

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

DeHaan, "Methods and Systems for Abstracting Cloud Management", U.S. Appl. No. 12/474,113, filed May 28, 2009.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for User Identity Management in Cloud-Based Networks", U.S. Appl. No. 12/127,102, filed May 27, 2008.

Ferris et al., "Systems and Methods for Identification and Management of Cloud-Based Virtual Machines", U.S. Appl. No. 12/128,768, filed May 29, 2008.

Ferris et al., "Methods and Systems for Managing Subscriptions for Cloud-Based Virtual Machines", U.S. Appl. No. 12/128,915, filed May 29, 2008.

Ferris, "Methods and Systems for Providing a Marketplace for Cloud-Based Networks", U.S. Appl. No. 12/130,929, filed May 30, 2008.

Ferris, "Systems and Methods for Management of Secure Data in Cloud-Based Network", U.S. Appl. No. 12/129,341, filed May 29, 2008.

Ferris et al., "Systems and Methods for Management of Virtual Appliances in Cloud-Based Network", U.S. Appl. No. 12/128,233, filed May 28, 2008.

Ferris, "Systems and Methods for Software Test Management in Cloud-Based Network", U.S. Appl. No. 12/127,940, filed May 28, 2008.

Ferris, "Methods and Systems for Load Balancing in Cloud-Based Networks", U.S. Appl. No. 12/127,926, filed May 28, 2008.

Ferris, "Methods and Systems for Automatic Self-Management of Virtual Machines in Cloud-Based Networks", U.S. Appl. No. 12/125,587, filed May 22, 2008.

Ferris et al., "Methods and Systems for Building Custom Appliances in a Cloud-Based Network", U.S. Appl. No. 12/128,787, filed May 29, 2008.

Ferris, "Methods and Systems for Optimizing Resource Usage for Cloud-Based Networks", U.S. Appl. No. 12/196,459, filed Aug. 22, 2008.

Williamson, "Systems and Methods for Promotion of Calculations to Cloud-Based Computation Resources", U.S. Appl. No. 12/200,281, filed Aug. 28, 2008.

Ferris, "Methods and Systems for Providing On-Demand Cloud-Computing Environments", U.S. Appl. No. 12/324,437, filed Nov. 26, 2008.

Ferris, "Methods and Systems for Providing Access Control to User-Controlled Resources in a Cloud Computing Environment", U.S. Appl. No. 12/324,621, filed Nov. 26, 2008.

Ferris, "Systems and Methods for Service Level Backup Using Re-Cloud Network", U.S. Appl. No. 12/324,803, filed Nov. 26, 2008.

Ferris, "Methods and Systems for Securing Appliances for Use in a Cloud Computing Environment", U.S. Appl. No. 12/324,563, filed Nov. 26, 2008.

Ferris, "Systems and Methods for Embedding a Cloud-Based Resource Request in a Specification Language Wrapper", U.S. Appl. No. 12/324,674, filed Nov. 26, 2008.

Ferris, "Methods and Systems for Providing a Market for User-Controlled Resources to be Provided to a Cloud Computing Environment", U.S. Appl. No. 12/390,617, filed Feb. 23, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

(56) References Cited

OTHER PUBLICATIONS

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12,627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

(56) References Cited

OTHER PUBLICATIONS

Morgan, "Systems and Methods for Self-Moving Operating System Installation in Cloud-Based Network", U.S. Appl. No. 13/149,877, filed May 31, 2011.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

MULTIPLE CLOUD MARKETPLACE AGGREGATION

FIELD

The present teachings relate to systems and methods for multiple cloud marketplace aggregation, and more particularly to platforms and techniques for generating responses to resource requests from a collective set of cloud-based marketplaces and selecting from those combined offerings to instantiate or update a virtual machine or other entity.

BACKGROUND OF RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application. Another type of software entity that has found certain application in certain spaces is software appliances, which generally speaking can represent relatively self-contained software installations including full or customized partial operating system installations, combined with selected applications in a single installation or update package.

Currently, when a user desires to can lease or subscribe to the set of resources, the user may request the set of resources based on their service level requirements and then receive a price for the request from a cloud marketplace system. Currently, no mechanism exists to permit those resource requests to be distributed to multiple cloud marketplace systems, to widen the range of available options or create the opportunity for redundancy in the sources for those requested resources. Thus, there is a need in the art for methods and systems that provide an ability to distribute or fan out a resource request to multiple cloud marketplace systems or platforms, and aggregate the resulting resource offerings to select a set of sources best suited to the requesting entity's needs.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
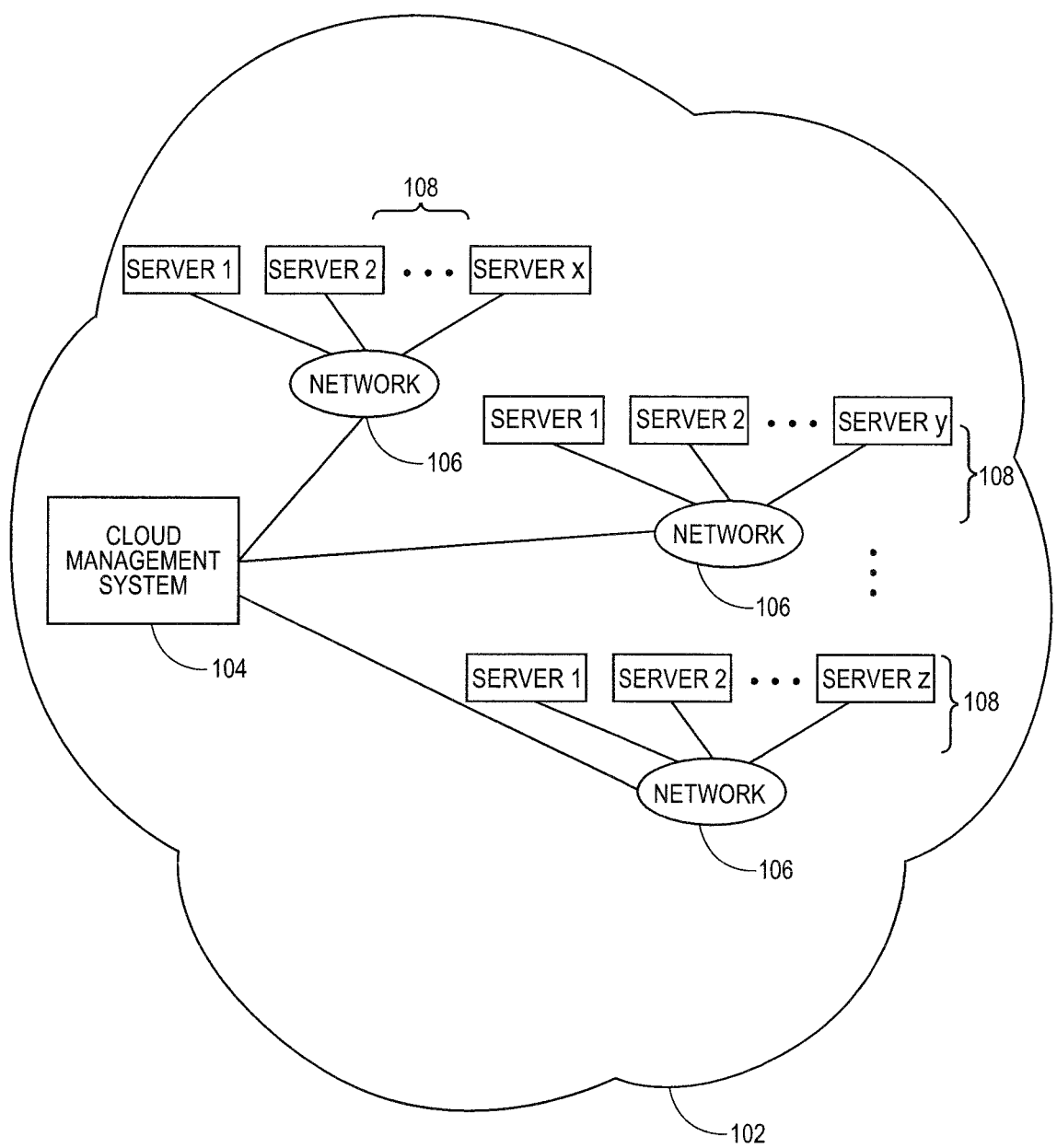
FIG. 1 illustrates an overall cloud system architecture in which various embodiments of the present teachings can be practiced.

Embodiments of the present teachings relate to systems and methods for multiple cloud marketplace aggregation. More particularly, embodiments relate to platforms and techniques for multiple marketplace aggregation in which a request for resources to instantiate or update a requesting entity can be transmitted to an aggregation engine. The aggregation engine can be configured to receive the resource request and replicate or transmit that request to a set of marketplace systems or platforms. The multiple marketplace systems can each communicate with a set of clouds from which processor, memory, software, or other resources can be requested and extracted. In embodiments, the aggregation engine can comprise a separate server, or, in embodiments, can be incorporated in a marketplace system.

The set of marketplace systems can respond to the replicated resource request with an indication of the resources that one or more of their constituent clouds are prepared to offer and deliver to the requesting virtual machine, or other requesting entity. In embodiments, the aggregation engine can employ selection logic to select one or more resource offerings from the set of marketplace systems, and provide those resources to the requesting virtual machine or other entity. In embodiments, a systems administrator or other user can manually select the desired marketplace sources from amongst the competing offerings. The aggregation engine can, in embodiments, select multiple more than one marketplace system to satisfy the request for resources, for instance to stagger the marketplace systems from which resources will be drawn at different times.

Embodiments of the present teachings thereby relate to systems and methods which operate in a marketplace environment based on cloud computing networks. More particularly, embodiments relate to platforms and techniques in which a cloud marketplace system provides details on the resources and services provided by the cloud computing environments, to allow users to evaluate the resources and services provided by the cloud computing environments in relation to the specific requirements of desired applications and/or software appliances.

According to embodiments, in general, the overall cloud marketplace system can be configured to communicate with multiple cloud computing environments in order to ascertain the details for the resources and services provided by the cloud computing environments. In particular, the cloud marketplace system can be configured to retrieve, from the cloud computing environments, resource and service data which describes the capabilities, services, status, and cost of the cloud computing environment. The resource and service data can include computing resources and services provided by the cloud computing environments, computing resources and services available in the cloud computing environments at particular time periods, cost data for computing resources and services provided by the cloud computing environments, and status data for the cloud computing environments at particular time periods.

In embodiments, in order to acquire the resource and service data, the cloud marketplace system can be configured to request the resource and service data from cloud management systems located in the cloud computing environments. Likewise, the cloud marketplace system can be configured to communicate with the resources of the cloud computing environments directly in order to obtain the resource and service data.

In embodiments, the cloud marketplace system can be configured to maintain a repository for the resource and service data in order to provide the marketplace for the cloud computing environments. The cloud marketplace system can be configured to update the repository periodically to maintain current resource and service data for the cloud computing environments. Likewise, when providing the marketplace, the cloud marketplace system can obtain the resource and service data, on-demand, and directly from the cloud computing environments.

In embodiments, to provide the marketplace, the cloud marketplace system can be configured receive a request for information pertaining to the resources or services provided by or available in the cloud computing environments. The cloud marketplace system can be configured to search the repository for resource and service data relating to the request. Likewise, the cloud marketplace system can be configured to obtain the resource and service data directly from the cloud computing environments. Once located, the cloud marketplace system can be configured to generate a marketplace report detailing the resource and service data matching the request. The cloud marketplace system can be configured to provide the report to initiator of the request.

In embodiments, the cloud marketplace system can be configured to utilize the resource and service data to provide migration services for virtual machines initiated in the cloud computing environments. In particular, for a particular virtual machine or machines, the cloud marketplace system can be configured to receive a request to monitor the resource and service data of the cloud computing environments for the occurrence of a particular event. The event can occur when a portion of the resource and service data reaches a threshold value received in the request to migrate. The cloud marketplace system can be configured to monitor the cloud computing environments in order to determine when the resources or services data indicates the occurrence of the event. Upon occurrence of the event, the cloud marketplace system can be configured to migrate the virtual machine or machines to a new cloud computing environment with the resources and services data matching the event.

By providing a marketplace for the services and resources of cloud computing environments, users can perform efficient cost-accounting for, shopping for, and migrations of existing and planned workloads to the best possible cloud computing environment. As such, the user can locate and find the best priced and best quality service for their intended applications and/or software appliances. Reference will now be made in detail to exemplary embodiments of the present teachings, which are illustrated in the accompanying drawings. Where possible the same reference numbers will be used throughout the drawings to refer to the same or like parts.

FIG. 1 illustrates an overall cloud computing environment, in which systems and methods for multiple cloud marketplace aggregation can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
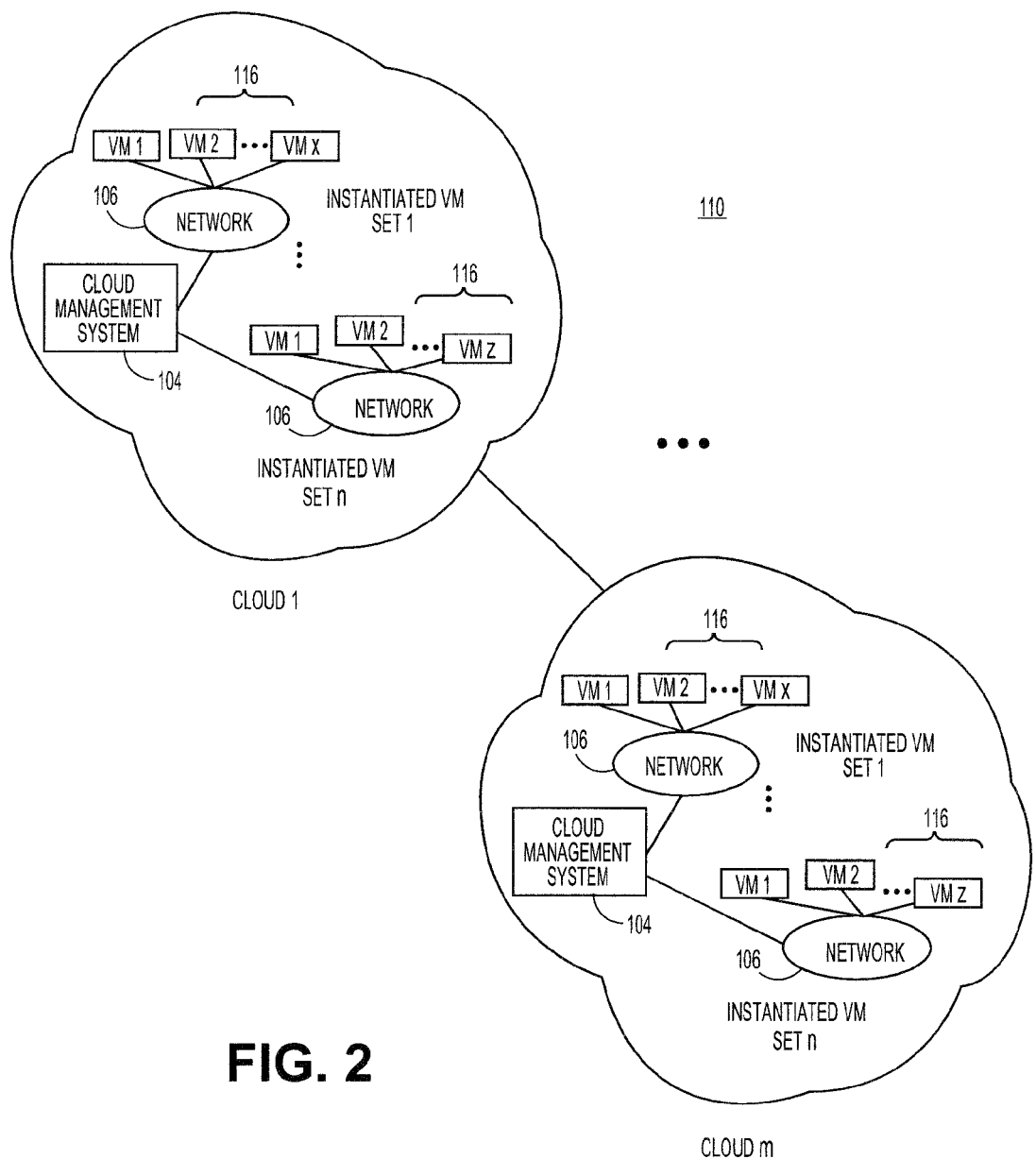
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
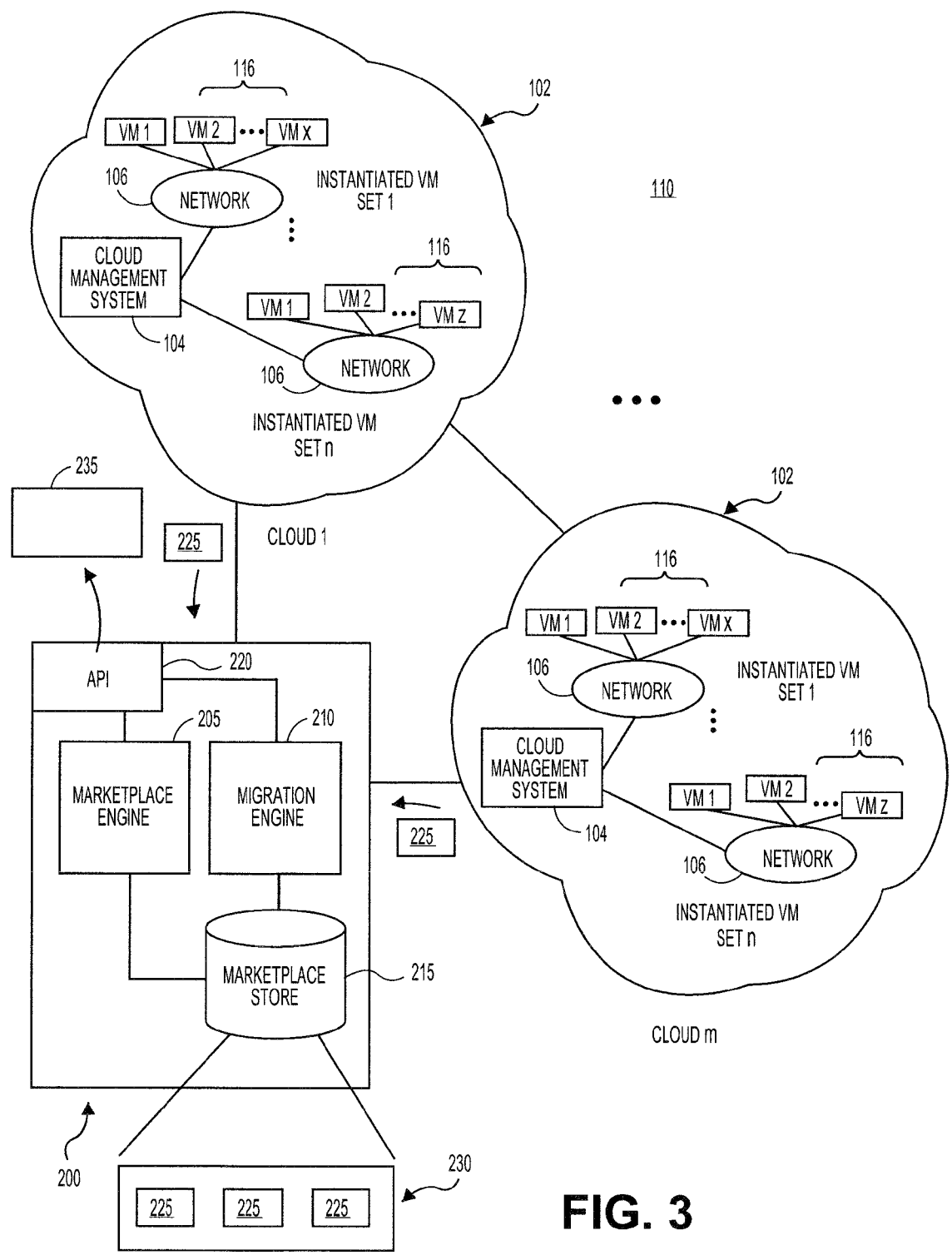
FIG. 3 illustrates an overall marketplace environment in which systems and methods for multiple cloud marketplace aggregation can operate, according to various embodiments.

FIG. 3 illustrates aspects of a cloud marketplace system 200 and its interaction with various clouds 102, according to various embodiments. In embodiments, the cloud marketplace system 200 provides a marketplace for the services provided by clouds 102. In embodiments as shown, the cloud marketplace system 200 can comprise a marketplace engine 205, a migration engine 210, a marketplace store 215, and an application programming interface (API) 220. The marketplace engine 205 can be configured to contain control logic for performing the marketplace processes and for communicating with the clouds 102, API 220, and marketplace store 215. In embodiments as shown, the cloud marketplace system 200 provides a marketplace for the services provided by clouds 102.

In embodiments, the cloud marketplace system 200 can be configured to communicate with the clouds 102 in order to ascertain the details for the resources and services provided by the clouds 102. In particular, the cloud marketplace system 200 can be configured to retrieve, from the clouds 102, resource and service data 225 which describes the capabilities, services, status, and cost of the clouds 102. The resource and service data 225 can include data detailing computing resources and services provided by the clouds 102, computing resources and services available in the clouds 102 at particular time periods, cost for the services provided by the clouds 102, and status for the clouds 102 at particular time periods.

In embodiments, the data detailing the computing resources and services provided by the clouds 102 can include resource data specifying the sets of resources servers 108 contained in the clouds 102 and the computing resources provided by the sets of resources servers 108 (computing cycles, bandwidth, memory, storage). Additionally, the data detailing the computing resources and services provided by the clouds 102 can include service data specifying particular services provided by the clouds 102 such as identity management services, cloud management services, application and appliance building services, and the like.

In embodiments, the data detailing the computing resources and services available in the clouds 102 at particular time periods can include data specifying computing resources and services available in the clouds 102 current or at some future time. Additionally, the data detailing the computing resources and services available in the clouds 102 at particular time periods can include data specifying service level agreements for the cloud 102 for a period of time.

In embodiments, the data detailing the cost for the resources and services provided by the clouds 102 can include data such as the cost for subscription to the clouds 102, the cost for usage of the resources and services of the clouds 102, and discounts of the costs based on the usage. For example, the cost for usage can include the cost for the resources consumed to support the virtual machines and can include the cost for the utilization of the virtual machines by the user or third parties. These can include the cost for the instantiated time of the virtual machines, the computing resource consumed by the virtual machines (computing cycles, bandwidth), the time frame of the computing resource consumption (peak time, off-peak time), and combinations thereof. The cost data can include cost data for a current time or cost data for resources and services in the future.

In embodiments, the data detailing the status for the clouds 102 at particular time periods can include data specifying the resources and services current being utilized in the clouds 102. For example, the status data can include virtual machines currently instantiated in the clouds 102 and the computing resources of the sets of resources servers 108 (computing cycles, bandwidth, memory, storage) currently utilized.

In embodiments, in order to acquire the resource and service data 225, the cloud marketplace system 200 can be configured to request the resource and service data 225 from cloud management systems 104 located in the clouds 102. Likewise, the cloud marketplace system 200 can be configured to communicate with the set of resource servers 108 directly in order to obtain the resource and service data 225. The cloud marketplace system 200 can be configured to communicate with the clouds 102 via network 106 or any other available public or private network. In particular, marketplace engine 205 can be configured to communicate with the clouds 102.

In embodiments, the cloud marketplace system 200 can be configured to maintain a repository 230 for the resource and service data 225 in order to provide the marketplace for the clouds 102. In particular, the marketplace engine 205 can be configured to maintain the repository 230. The repository 230 can be configured in any format to allow the resource and service data 225 to be stored and retrieved. For example, the repository can be configured in any type of proprietary or open-source database format. The repository 230 can include a record for each cloud 102 that includes various searchable data fields for storing the resource and service data 225 for that particular cloud.

The cloud marketplace system 200 can be configured to update the repository 230 periodically to maintain current resource and service data 225 for the clouds 102. Likewise, when providing the marketplace, the cloud marketplace system 200 can be configured to obtain the resource and service data 225, on-demand, and directly from the clouds 102.

In embodiments, to provide the marketplace, the cloud marketplace system 200 can be configured receive a request for information pertaining to the resources or services provided by or available in the clouds 102. For example, a initiator may request information on clouds 102 that can provide a certain level of computing resources at a specific cost during a specific time period. The initiator of the request the information in order to see all available resources of the clouds 102 that may meet the initiators requirements. As such, the request can include the information regarding the resources desired by the initiator. This can include the desired computing resources, the time period for the resources, the duration of the resources, the cost of the resources, services provided by the cloud, the availability of the resources, and the like.

In particular, the marketplace engine 205 can be configured to communicate with the initiator of the request via API 220. API 220 can be configured to generate GUIs, e.g. dialog boxes, web pages, as required by marketplace engine 205 and to provide an interface for receiving requests. The initiator of the request can be a user desiring utilization of the clouds 102 or the cloud management systems 104 of the clouds 102.

Once the request is received, the cloud marketplace system 200 can be configured to search the repository 230 for resource and service data 225 relating to the request. In particular, the marketplace engine 205 can be configured to access the repository 230 stored in marketplace store 215 and search the repository 230 for resource and service data 225 matching the request. Likewise, the cloud marketplace system 200 can be configured to obtain the resource and service data 225 directly from the clouds 102.

Once located, the cloud marketplace system 200 can be configured to generate a marketplace report 235 detailing the resource and service data 225 matching the request. For example, the marketplace report 235 can include a list of clouds 102 matching the request alone with the data detailing computing resources and services provided by the matching clouds 102, computing resources and services available in the matching clouds 102 at particular time periods specified in the request, cost for the services and resources requested, and status for the matching clouds 102 at particular time periods specified in the request.

In particular, the marketplace engine 205 can be configured to extract the matching resource and service data from repository 230. Marketplace engine 205 can be configured to arrange the matching resource and service data 225 in marketplace report 235.

After generating the marketplace report 235, the cloud marketplace system 200 can be configured to provide the marketplace report 235 to the initiator of the request. In particular, the marketplace engine 205 can be configured to provide the marketplace report 235 via API 220.

Once the report is received, the initiator or the user can make a determination on which resources of the clouds 102 to utilize. This can include utilizing resources from a single cloud 102 or resources from multiple clouds 102. For example, the initiator can select one or more cloud 102 with which to instantiate a virtual machine or machines. The initiator can make a request for the resources directly to the clouds 102. Likewise, the cloud marketplace system 200 can be configured to receive the initiator's requests for resources and forward the request to the clouds 102, or reserve the resources directly.

In embodiments, the cloud marketplace system 200 can be configured to utilize the resource and service data to provide automatic migration services for virtual machines initiated in the clouds 102. In particular, the migration engine 210 can be configured to contain control logic for performing the migration processes and for communicating with the clouds 102, API 220, and marketplace store 215.

In embodiments, for a particular virtual machine or machines instantiated in one of the clouds 102, the cloud marketplace system 200 can be configured to receive a request to monitor the resource and service data 225 of the clouds 102 for the occurrence of a particular event. The event can be the occurrence of a particular resource or service becoming available in a cloud 102. The event can be occur when a portion of the resource and service data 225 reaches a threshold value received in the request to migrate. For example, a user can request that the cloud marketplace system 200 migrate a virtual machine or machines when a particular computing resources at a specified cost becomes available in one of the clouds 102.

In particular, the migration engine 210 can be configured to communicate with the user or the initiator of the request via API 220. API 220 can be configured to generate GUIs, e.g. dialog boxes, web pages, as required by migration engine 210 and to provide an interface for receiving requests.

To migrate the virtual machine or machines, the cloud marketplace system 200 can be configured to monitor the clouds 102 in order to determine when the resources or services data 225 indicates the occurrence of the event. In particular, the migration engine 210 can be configured to periodically search the repository 230 for the resources and services data 225 matching event. Likewise, the migration engine 210 can be configured to obtain the resource and service data 225, periodically, directly from the clouds 102.

Upon occurrence of the event, the cloud marketplace system 200 can be configured to migrate the virtual machine or machines to a new cloud 102 with the resources and services data matching the event. For example, the cloud marketplace system 200 can determine that a new cloud 102 has resources or services available that match the user's request and can migrate the virtual machines to the new cloud 102. In particular, the migration engine 210 can be configured send an instruction, to the cloud 102 currently instantiating the virtual machine or machines, to migrate the virtual machine or machines to the new cloud 102. The instruction can include an identification of the virtual machine or machines and an identification of the new cloud 102. Likewise, the migration engine 210 can be configured to retrieve the virtual machine or machines from the cloud 102 currently instantiating the virtual machine or machines and pass the virtual machine or machines to the new cloud 102 for instantiation.

Once migrated, the cloud marketplace system 200 can be configured to notify the user or initiator of the migration. In particular, migration engine 210 can be configured to notify the user or initiator via API 220.

Figure 4:
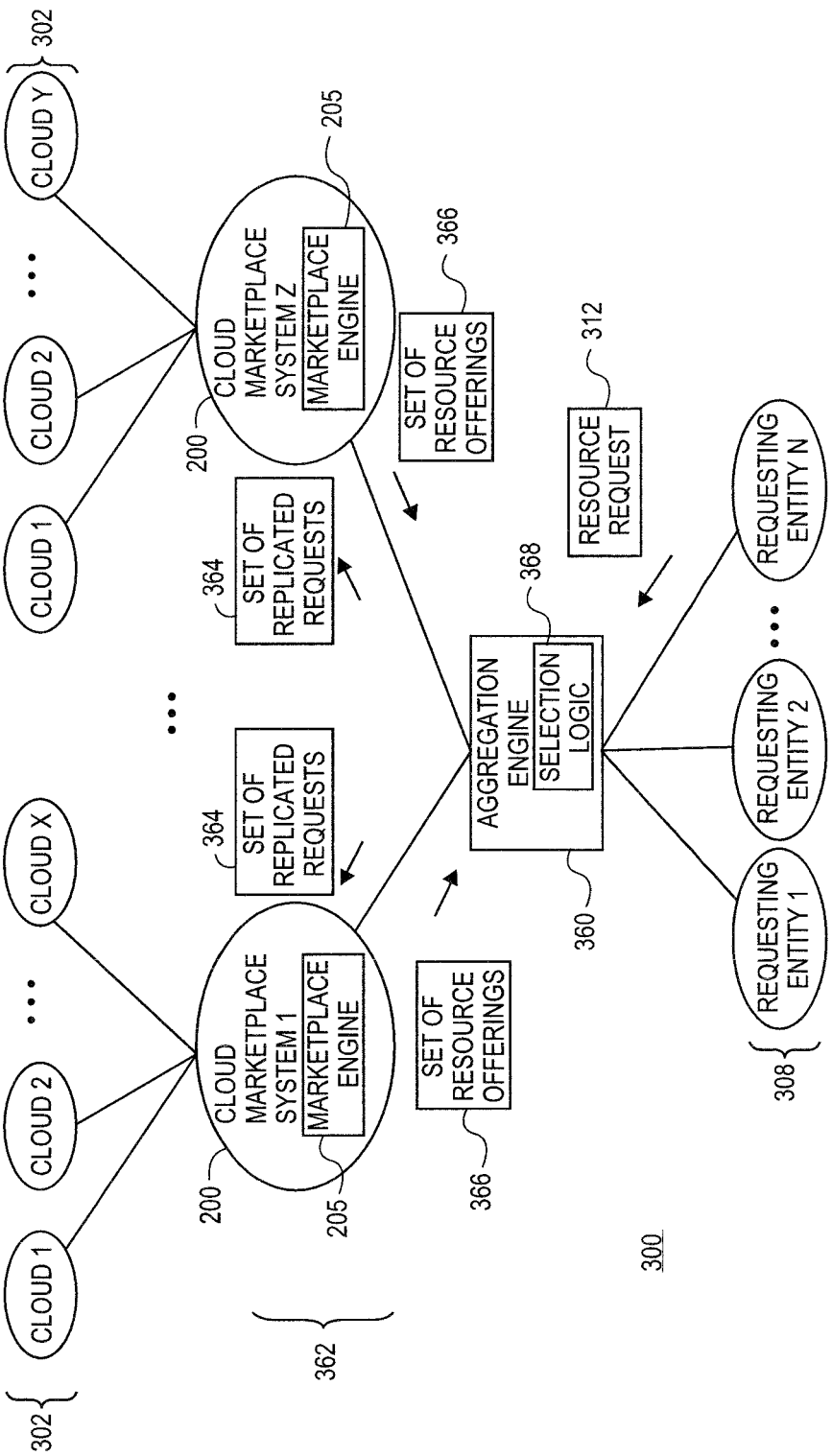
FIG. 4 illustrates an overall marketplace environment in which systems and methods for multiple cloud marketplace aggregation can operate including request distribution and resource aggregation, according to various embodiments.

FIG. 4 illustrates an overall system 300, consistent with systems and methods for multiple cloud marketplace aggregation, according to various embodiments. In embodiments as shown, a set of requesting entities 308 can communicate with an aggregation engine 360, to transmit a resource request 312 to aggregation engine 360. In embodiments, the resource request 312 can contain or encode a request for a set of specified resources from cloud sources. In embodiments, the requested resources can include, for instance, processor cycles, memory allocation, installed applications, operating systems, service levels under a service level agreement (SLA), and/or other hardware, software, network, input/output (I/O), and/or other resources.

The aggregation engine 360 can receive the resource request 312 and decode that request to determine the corresponding, hardware, software, network, input/output (I/O), and/or other resources necessary to satisfy the request. Aggregation engine 360 can in turn transmit a set of replicated requests 364 to marketplace systems 200 within a set of multiple cloud marketplaces 362. In embodiments as shown, each individual marketplace system 200 can likewise in turn communicate with a set of clouds 302 to identify resources available with those cloud networks to potentially satisfy the resource request 312. After interrogating associated clouds in set of clouds 302, each individual marketplace system 200 can generate a set of resource offerings 366 representing the hardware, software, network, input/output, and/or other resources that particular marketplace system 200 along with its associated set of clouds 302 is prepared to delivery to the requesting entity. Each marketplace system 200 can transmit the set of resource offerings to aggregation engine 360. It may be noted that although a configuration is illustrated in FIG. 4 in which aggregation engine 360 communicates with set of multiple cloud marketplaces 362 in a generally parallel configuration, in various embodiments, the individual marketplace systems 200 can be arranged in a serial configuration, in a mixed serial/parallel configuration, or in other configurations. In embodiments, the individual marketplace systems 200 can be configured in multiple layers or levels, likewise in various parallel, serial, mixed serial/parallel, and/or other configurations.

Aggregation engine 360 can receive the various sets of resource offerings 366, and examine that information to determine which marketplace system(s) 200 and associated set(s) of clouds 302 will be utilized to supply the resources specified in the resource request 312. Aggregation engine 360 can host selection logic 368 to select between the various sets of resource offerings 366. Selection logic 368 can, for example, identify resources most closely matching a requested service level agreement (SLA), or other hardware, software, network, input/output (I/O) and/or other resources or factors. Selection logic 368 can incorporate selection based on cost factors. Selection logic 368 can likewise base selection of resources on scheduled resource availability, and can, for example, sequence or stagger individual marketplace systems 200 to supply different resources at different times. Other selection criteria are possible.

After identifying the marketplace system(s) 200 from set of multiple marketplace systems 362, aggregation engine 360 can manage the instantiation and/or delivery of the constituent resources to the requesting entity(ies) in set of requesting entities 308. For example, aggregation engine 360 and/or other logic can instantiate, access, transmit, or otherwise provide hardware, software, network, input/output (I/O) and/or resources to the requesting entity. The result of the resource delivery can be, for example, the instantiation or updating of a virtual machine, including for example virtual clients and/or software appliances, as well as the installation of one or more software applications, the delivery of data, the provisioning of service level agreements (SLAs), or other cloud activity.

Figure 5:
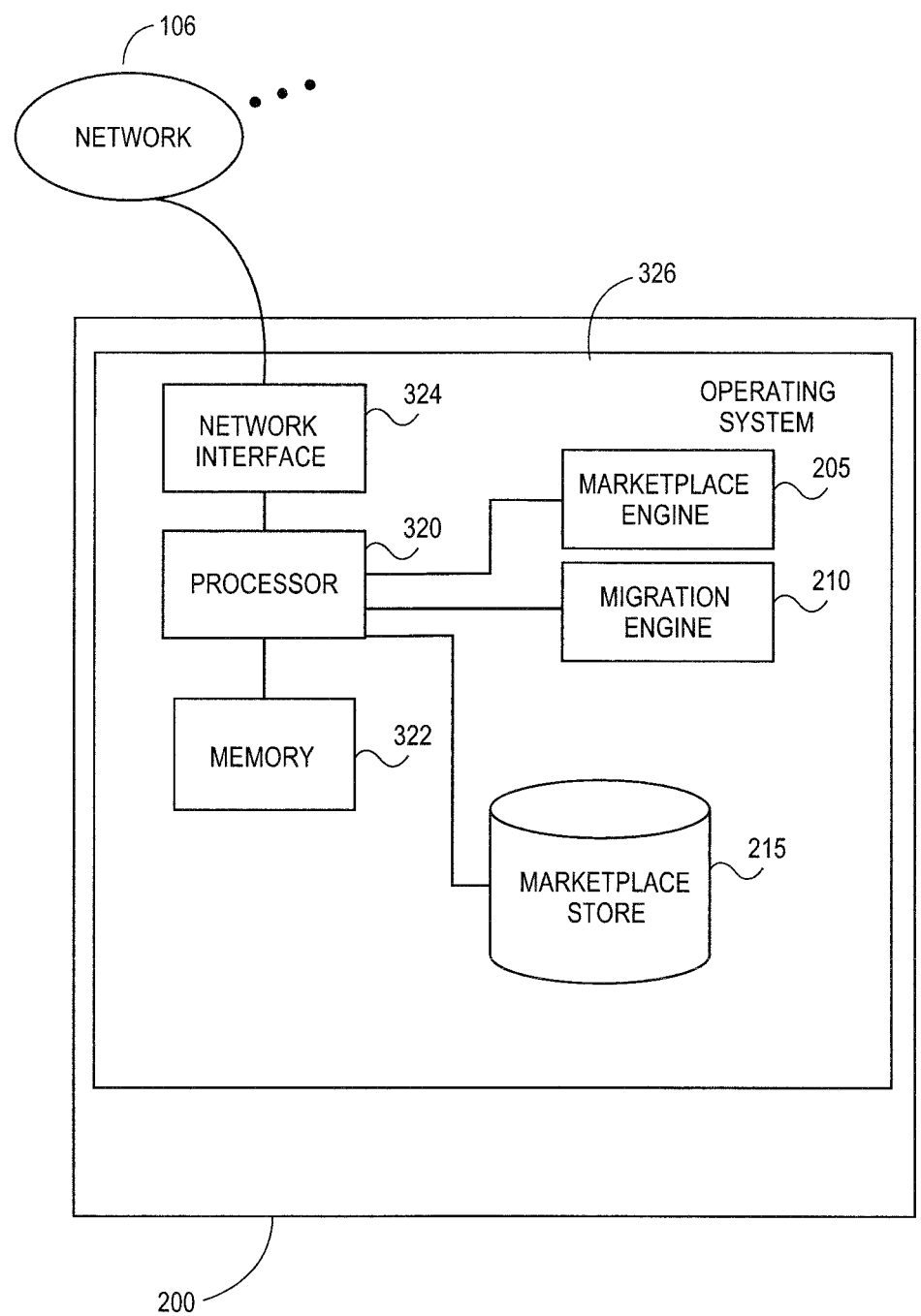
FIG. 5 illustrates an exemplary hardware implementation of a marketplace system, according to various embodiments.

FIG. 5 illustrates an exemplary diagram of hardware and other resources that can be incorporated in a cloud marketplace system 200 configured to communicate with instantiated clouds 102, set of clouds 302, and users or initiators via one or more networks 106, according to embodiments. In embodiments as shown, the cloud marketplace system 200 can comprise a processor 320 communicating with memory 322, such as electronic random access memory, operating under control of or in conjunction with operating system 326. Operating system 326 can be, for example, a distribution of the Linux™ operating system, the Unix™ operating system, or other open-source or proprietary operating system or platform. Processor 320 also communicates with the marketplace store 215, such as a database stored on a local hard drive. Processor 320 further communicates with network interface 324, such as an Ethernet or wireless data connection, which in turn communicates with one or more networks 106, such as the Internet or other public or private networks. Processor 320 also communicates with marketplace store 215 and the marketplace engine 205, to execute control logic and perform the marketplace process described herein. Additionally, processor 320 also communicates with marketplace store 215 and the migration engine 210, to execute control logic and perform the migration process described above. Other configurations of the cloud marketplace system 200, associated network connections, and other hardware and software resources are possible.

While FIG. 5 illustrates the cloud marketplace system 200 as a standalone system comprises a combination of hardware and software, the cloud marketplace system 200 can also be implemented as a software application or program capable of being executed by a convention computer platform. Likewise, the cloud marketplace system 200 can also be implemented as a software module or program module capable of being incorporated in other software applications and programs. In either case, the cloud marketplace system 200 can be implemented in any type of conventional proprietary or open-source computer language.

Additionally, as illustrated in FIG. 5, the cloud marketplace system 200 can be a standalone system capable of being access by or controlled by a user or initiator of the marketplace and migration processes. Likewise, the cloud marketplace system 200 can be integrated into one or more of the clouds 102. Additionally, the cloud marketplace system 200 can be integrated into one or more of the systems of the clouds 102 such as the cloud management systems.

Figure 6:
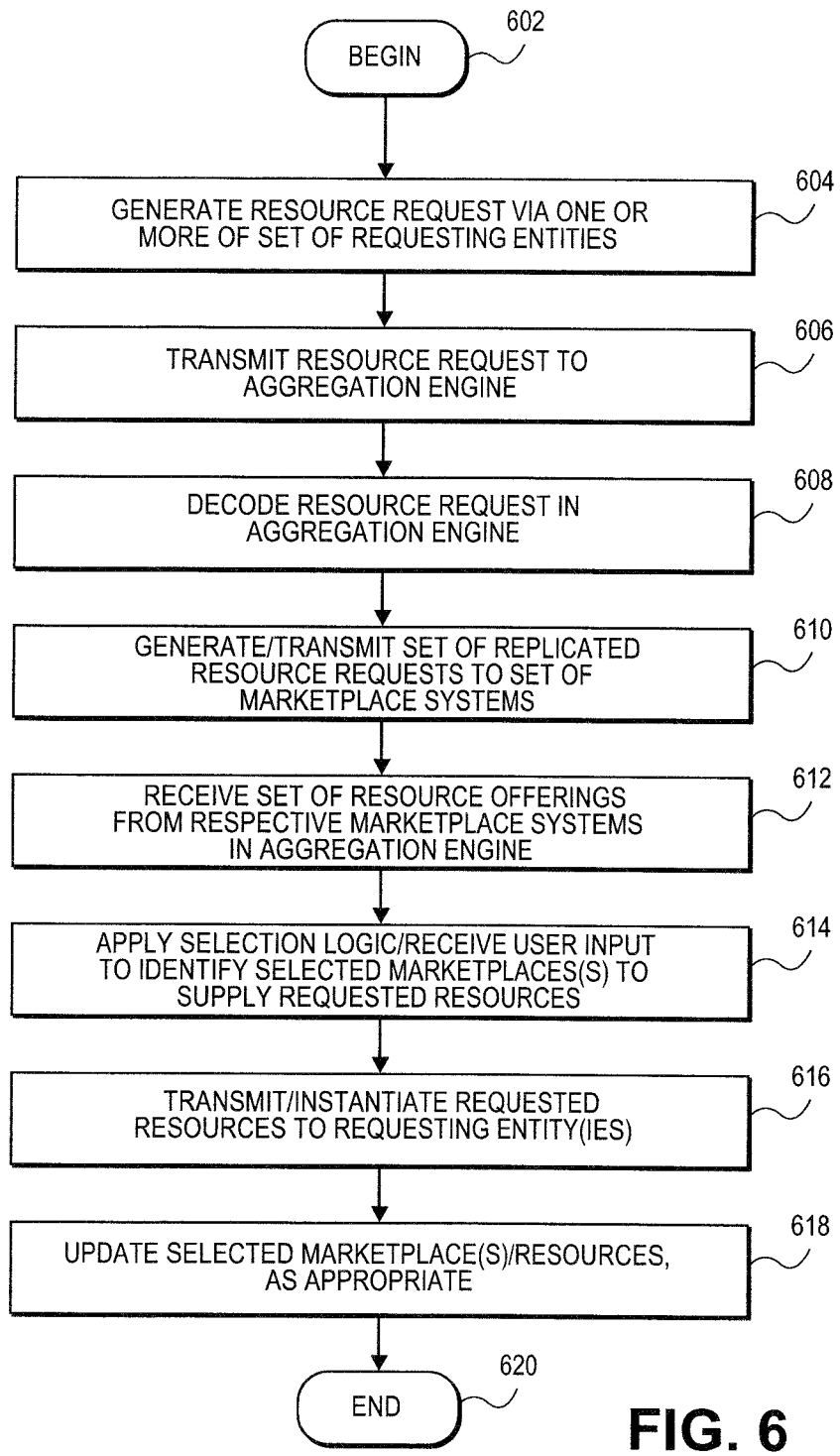
FIG. 6 illustrates a flowchart of overall processing for multiple cloud marketplace aggregation, according to various embodiments.

FIG. 6 illustrates a flowchart of processing for multiple cloud marketplace aggregation, according to various embodiments. In 602, processing can begin. In 604, at least one of a set of requesting entities can generate a resource request 312. For example, a resource request 312 can be generated for a set of messaging, browser, or other applications that a user or resource wishes to install in or from a cloud. In 606, the resource request 312 can be transmitted to an aggregation engine 360. In 608, the resource request 312 can be decoded in aggregation engine 360. In embodiments, for example, a request to install an operating system in a virtual machine can be decoded to identify a version of operating system, and minimum necessary processor cycles, memory, and/or other resources.

In 610, the aggregation engine 360 can generate and transmit a set of replicated resource requests 364 to a set of multiple cloud marketplaces 362. In embodiments, set of multiple cloud marketplaces 362 can contain multiple marketplace systems 200, which in embodiments can be of similar or diverse type, capability, and/or location. In 612, the marketplace systems 200 can of the set of multiple cloud marketplaces 362 can generate a set of resource offerings 366, and transmit those offerings to aggregation engine 360. In 614, the aggregation engine 360 can apply selection logic 368 to the set of resource offerings 366 to identify the resources and marketplace(s) that will be invoked to satisfy the resource request 312. In embodiments, selection logic 368 can examine set of resource offerings 366 to select resources, marketplace(s), and/or cloud(s) based on criteria such as subscription or other cost, processing performance, service availability under a service level agreement (SLA), and/or other factors. In embodiments, in addition to or instead of selection logic 368, a user can supply input to select from among the set of resource offerings 366.

In 616, the selected resources can be transmitted from and/or instantiated via aggregation engine 360 and associated cloud resources to the one or more requesting entities in set of requesting entities 308. In 618, the selected marketplace(s), cloud(s), and/or other resources can be updated, as appropriate, for example as a result of a change in one or more marketplace systems 200, and/or receipt of a new or updated resource request 312. In 630, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single aggregation engine 360 supports the resource requests of a set of requesting entities 308, in embodiments, multiple aggregation engines, servers, or logic can communicate with the set of requesting entities 308 to build virtual machines or other objects from resources produced by the set of multiple cloud marketplaces 362. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving, by a processor, a request from a requesting entity, the request specifying information pertaining to a computing resource provided by one or more clouds;
   generating, by the processor, a set of replicated requests in view of the request;
   transmitting, by the processor, the set of the replicated requests to a plurality of marketplace systems, each of the plurality of marketplace systems being associated with at least one of the one or more clouds;
   receiving, by the processor, in response to the replicated requests, a set of resource offerings from the plurality of marketplace systems;
   updating, by the processor, one or more records in a repository in view of the set of resource offerings received from the plurality of marketplace systems, wherein the repository comprises a record for each of the one or more clouds, each record storing resource and service data for a respective cloud;
   identifying, by the processor, resource and service data in the repository that match the information pertaining to the computing resource specified in the request in view of the updated one or more records in the repository; and
   providing information to the requesting entity indicating resource and service data in the repository satisfy the request.

2. The method of claim 1, wherein the request is to migrate a virtual machine and the information in the request specifies an event defined by a threshold value to be applied to the resource and service data in the repository.

3. The method of claim 2, wherein identifying comprises searching the resource and service data in the repository for resource and service data matching the event.

4. The method of claim 2, wherein providing the information to the requesting entity comprises:
   migrating the virtual machine to a cloud having resource and service data matching the event; and
   notifying the requesting entity of the migrating.

5. The method of claim 1, wherein the request specifies at least one of a processor resource, memory resource, input/output (I/O) resource, application resource, operating system resource, or service level represented by a service level agreement.

6. The method of claim 5, wherein identifying comprises searching the resource and service data in the repository for resource and service data that matches the specified at least one of processor resource, memory resource, input/output (I/O) resource, application resource, operating system resource, or service level represented by a service level agreement in the request.

7. The method of claim 5, wherein providing the information to the requesting entity comprises:
   extracting resource and service data from the repository that matches the information specified in the request;
   generating a report comprising the resource and service data extracted from the repository; and
   providing the report to the requesting entity.

8. The method of claim 1, further comprising providing one or more resources to the requesting entity.

9. A system comprising:
   a first interface to a requesting entity;
   a second interface to a plurality of marketplace systems; and an aggregation engine, comprising a processor to communicate with memory, the requesting entity via the first interface, and the plurality of marketplace systems via the second interface, the processor to:
  receive from the requesting entity a request specifying information pertaining to a computing resource provided by one or more clouds,
  generate a set of replicated requests in view of the request,
  transmit the set of replicated requests to the plurality of marketplace systems, each of the plurality of marketplace systems being associated with at least one of the one or more clouds,
  receive, in response to the replicated requests, a set of resource offerings from the plurality of marketplace systems,
  update one or more records in a repository in view of the set of resource offerings received from the plurality of marketplace systems, wherein the repository comprises a record for each of the one or more clouds, each record storing resource and service data for a respective cloud,
  identify resource and service data in the repository that match the information pertaining to the computing resource specified in the request in view of the updated one or more records in the repository; and
  provide information to the requesting entity indicating resource and service data in the repository satisfy the request.

10. The system of claim 9, wherein the request is to migrate a virtual machine and the information in the request specifies an event defined by a threshold value to be applied to the resource and service data in the repository.

11. The system of claim 10, wherein to identify comprises the processor to search the resource and service data in the repository for resource and service data matching the event.

12. The system of claim 10, wherein to provide comprises the processor to:
  migrate the virtual machine to a cloud having resource and service data matching the event; and
  notify the requesting entity of the migrating.

13. The system of claim 9, wherein the request specifies at least one of a processor resource, memory resource, input/output (I/O) resource, application resource, operating system resource, or service level represented by a service level agreement.

14. The system of claim 13, wherein to identify comprises the processor to search the resource and service data in the repository for resource and service data that matches the specified at least one of processor resource, memory resource, input/output (I/O) resource, application resource, operating system resource, or service level represented by a service level agreement in the request.

15. The system of claim 13, wherein to provide comprises the processor is to:
  extract resource and service data from the repository that matches the information specified in the request;
  generate a report comprising the resource and service data extracted from the repository; and
  provide the report to the requesting entity.

16. The system of claim 9, wherein the processor is further to provide one or more resources to the requesting entity.

17. A non-transitory computer readable storage medium including instructions that, when executed by a processor cause the processor to perform operations comprising:
  receiving a request from a requesting entity, the request specifying information pertaining to a computing resource provided by one or more clouds;
  generating a set of replicated requests in view of the request;
  transmitting the set of the replicated requests to a plurality of marketplace systems, each of the plurality of marketplace systems being associated with at least one of the one or more clouds;
  receiving in response to the replicated requests, a set of resource offerings from the plurality of marketplace systems;
  updating, by the processor, one or more records in a repository in view of the set of resource offerings received from the plurality of marketplace systems, wherein the repository comprises a record for each of the one or more clouds, each record storing resource and service data for a respective cloud;
  identifying resource and service data in the repository that match the information pertaining to the computing resource specified in the request in view of the updated one or more records in the repository; and
  providing information to the requesting entity indicating resource and service data in the repository satisfy the request.

18. The non-transitory computer readable storage medium of claim 17, wherein the request is to migrate a virtual machine and the information in the request specifies an event defined by a threshold value to be applied to the resource and service data in the repository, and the identifying of resource and service data in the repository comprises:
  searching the resource and service data in the repository for resource and service data matching the event.

19. The non-transitory computer readable storage medium of claim 18, wherein providing the information to the requesting entity comprises:
  migrating the virtual machine to a cloud having resource and service data matching the event; and
  notifying the requesting entity of the migrating.

20. The non-transitory computer readable storage medium of claim 17, wherein the request specifies at least one of a processor resource, memory resource, input/output (I/O) resource, application resource, operating system resource, or service level represented by a service level agreement, and the identifying of resource and service data in the repository comprises:
  searching the resource and service data in the repository for resource and service data that matches the specified at least one of processor resource, memory resource, input/output (I/O) resource, application resource, operating system resource, or service level represented by a service level agreement in the request.

21. The non-transitory computer readable storage medium of claim 20 wherein providing the information to the requesting entity comprises:
  extracting resource and service data from the repository that matches the information specified in the request;
  generating a report comprising the resource and service data extracted from the repository; and
  providing the report to the requesting entity.

* * * * *